(12) United States Patent
Greer et al.

(10) Patent No.: US 6,948,222 B1
(45) Date of Patent: Sep. 27, 2005

(54) HOSE AND TUBE ASSEMBLY DEVICE

(75) Inventors: Jerry R. Greer, Cookeville, TN (US); Donald R. Kelley, Cookeville, TN (US)

(73) Assignee: Integral Automation Systems, Inc., Cookeville, TN (US)

( * ) Notice: Subject to any disclaimer, the term of this patent is extended or adjusted under 35 U.S.C. 154(b) by 0 days.

(21) Appl. No.: 10/648,839

(22) Filed: Aug. 26, 2003

(51) Int. Cl.[7] .............................................. B23P 19/02
(52) U.S. Cl. ........................... 29/235; 29/450; 29/272; 29/428; 81/342; 81/345; 285/23
(58) Field of Search ..................... 29/272, 270, 271, 29/450, 235, 234, 282, 428, 407.09, 455.1, 29/509, 520; 285/18, 23, 24, 148.19, 239, 285/242; 81/315, 342, 345, 355

(56) References Cited

U.S. PATENT DOCUMENTS

| | | | |
|---|---|---|---|
| 3,299,496 A * | 1/1967 | Christensen | 29/237 |
| 4,189,817 A * | 2/1980 | Moebius | 29/237 |
| 4,483,056 A * | 11/1984 | Schwalm et al. | 29/237 |
| 4,893,393 A * | 1/1990 | Marshall | 29/237 |
| 5,513,425 A * | 5/1996 | Williams | 29/237 |
| 6,311,378 B1 * | 11/2001 | Menguc | 29/235 |

* cited by examiner

*Primary Examiner*—David P. Bryant
*Assistant Examiner*—Stephen Kenny
(74) *Attorney, Agent, or Firm*—Waddey & Patterson, P.C.; Lucian Wayne Beavers (57) ABSTRACT

A hand held power assisted apparatus is provided for assembling a rigid tube into a flexible hose in an automobile assembly line environment. The apparatus includes a frame with first and second gripper assemblies mounted on the frame. An actuator assembly is connected between the frame and the first gripper assembly for moving the first gripper assembly toward the second gripper assembly to insert the rigid tube into the flexible hose.

26 Claims, 9 Drawing Sheets

FIG. 9A (Neutral Position)

FIG. 9B
(Close First Trigger)

FIG. 9C
(Close Second Trigger)

HOSE AND TUBE ASSEMBLY DEVICE

BACKGROUND OF THE INVENTION

1. Field of the Invention

The present invention relates generally to automated assembly devices for use in installing components on an assembly line, and more particularly, but not by way of limitation, to a device for use in installing a flexible hose on a rigid tube such as installing a fuel filter hose onto a fuel line in an automobile assembly plant.

2. Description of the Prior Art

Traditionally, the installation of flexible hoses and rigid tubing to connect the various component of an automotive engine assembly in an automotive assembly line has included the manual insertion of the rigid tube within the flexible hose. When performing such an action on an automobile assembly line, the repetitive nature of the task plus the stresses involved lead to operator fatigue, and in severe situations can result in workplace injuries such as carpal tunnel syndrome.

Accordingly, there is a need for an automated device which can assist in such operations.

SUMMARY OF THE INVENTION

The present invention provides an apparatus for automated assembly for first and second components on an assembly line. While those components may be a flexible hose and a rigid tube, in its broadest application the present invention can be utilized for assembling other components of similar elongated cylindrical shapes wherein one needs to be inserted in the other, such as for example the insertion of one electrical component into another to make an electrical connection. The apparatus includes a moveable frame adapted to be moveable relative to an assembly line so that the frame can be oriented relative to one of the components on the assembly line. The apparatus further includes first and second holder assemblies mounted on the frame and adapted to hold the first and second components, along with an actuator assembly connected to the frame and the first holder assembly for moving the first holder assembly toward the second holder assembly to insert one of the components into the other component.

In another aspect the present invention provides an apparatus for assembling a rigid tube into a flexible hose. The apparatus includes a frame, a first gripper assembly attached to the frame and including a first set of gripper jaws for gripping one of the flexible hose and the rigid tube. The apparatus further includes a second gripper assembly connected to the frame and including a second set of gripper jaws for gripping the other of the flexible hose and the rigid tube. An actuator assembly is connected to the frame and to the first gripper assembly for moving the first gripper assembly toward the second gripper assembly to insert the rigid tube into the flexible hose.

In still another aspect of the invention, a component installation apparatus includes a manually manipulatable frame including a guide. A first gripper assembly is mounted on the guide for movement relative to the frame, and includes a first pair of jaws. A second gripper assembly is connected to the frame and includes a second pair of jaws aligned with the first pair of jaws. An actuator is connected between the frame and the first gripper assembly and arranged to move the first gripper assembly back and forth upon the guide.

The present invention also includes a method of assembling a flexible hose and a rigid tube, which includes steps of gripping the flexible hose with a first pair of powered jaws mounted on a frame, gripping the rigid tube with a second pair of powered jaws mounted on the frame, and moving the first pair of powered jaws toward the second pair of powered jaws with power assistance and thereby inserting the rigid tube into the flexible hose.

Accordingly, it is an object of the present invention to provide a hand held power assisted device for inserting one article into another on assembly line.

Another object of the present invention is the provision of an apparatus for assembling a rigid tube into a flexible hose on an assembly line.

Still another object of the present invention is the provision of an apparatus for assembling a fuel filter hose on a fuel line in an automobile assembly plant.

Still another object of the present invention is the provision of a power assisted hand held device for assembling a hose and a tube while providing for safe operation thereof.

And another object of the present invention is the provision of power assisted methods of assembling cylindrical tubing components in an assembly line environment.

Other and further objects features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
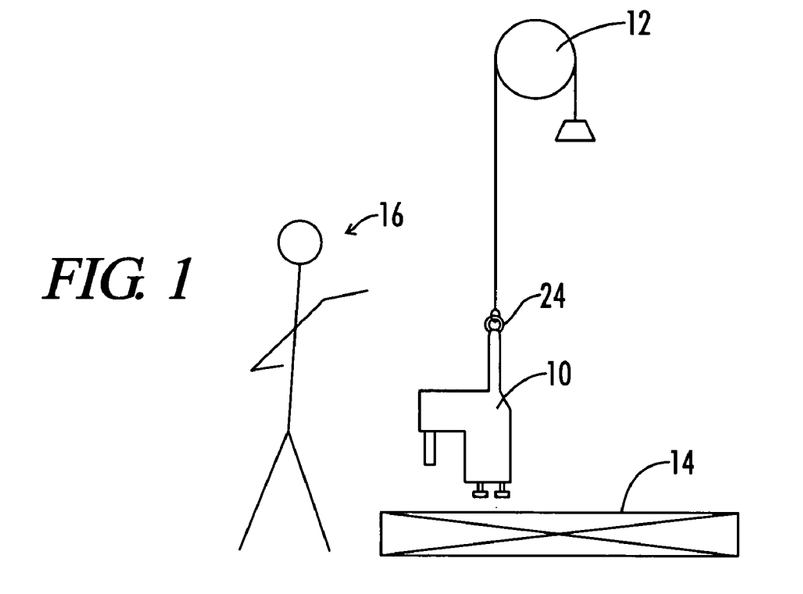
FIG. 1 is a schematic illustration of the hand held hose insertion tool apparatus of the present invention suspended from a counterbalance in an automotive assembly plant.

Referring now to the drawings, and particularly to FIG. 1, an automobile plant assembly line environment is illustrated wherein the hand held power assisted assembly device 10 of the present invention is shown suspended from a counterbalance 12 above an engine compartment of an automobile 14 that is under assembly. A human operator 16 can manually engage the apparatus 10 to assemble flexible hoses with rigid tubing in the engine bay of the automobile 14 as is further described below.

As will be understood by those skilled in the art, the counterbalance 12 is only schematically illustrated and is a device commonly used in an automotive assembly plant for suspending hand held powered apparatus so that a human operator can move the apparatus about without supporting the bulk of the weight of the apparatus.

Figure 2:
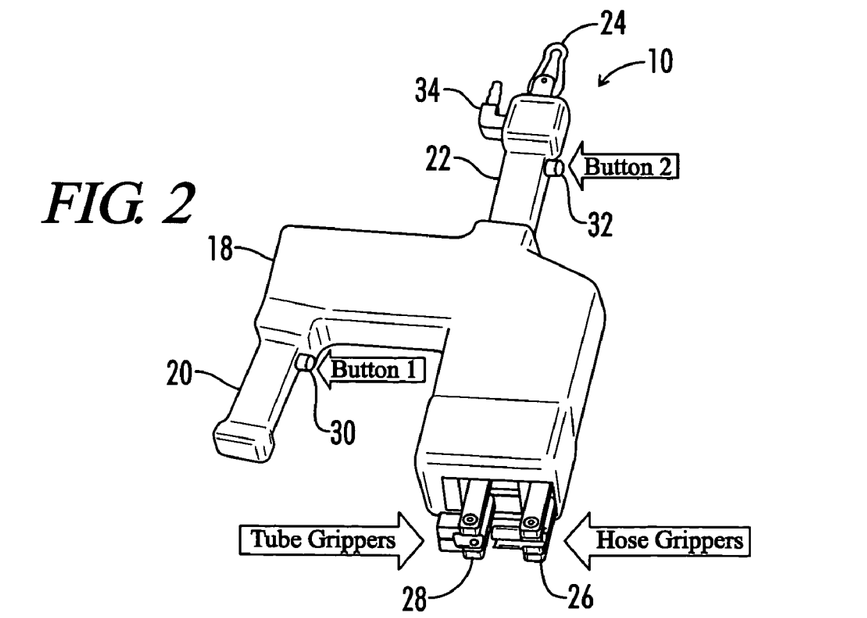
FIG. 2 is a perspective view of the hand held assembly apparatus.

FIG. 2 shows a perspective view of the apparatus 10 which includes an enclosed frame or housing 18 having first and second handles 20 and 22 extending downward and upward therefrom, respectively. A connector 24 is located upon the upper end of the second handle 22 for connection to the counterbalance 12 as illustrated in FIG. 1.

A first moveable gripper assembly 26 and a second fixed gripper assembly 28 are seen projecting downward from the frame 18. A first trigger or button 30 is mounted in the first handle 20 and a second trigger or button 32 is mounted in the second handle 22. A pneumatic connection 34 is provided for connecting the apparatus 10 to a conventional clean dry compressed air supply at 60 to 100 psi. The gripper assemblies 26 and 28 may also be referred to as holder assemblies.

Figure 3:
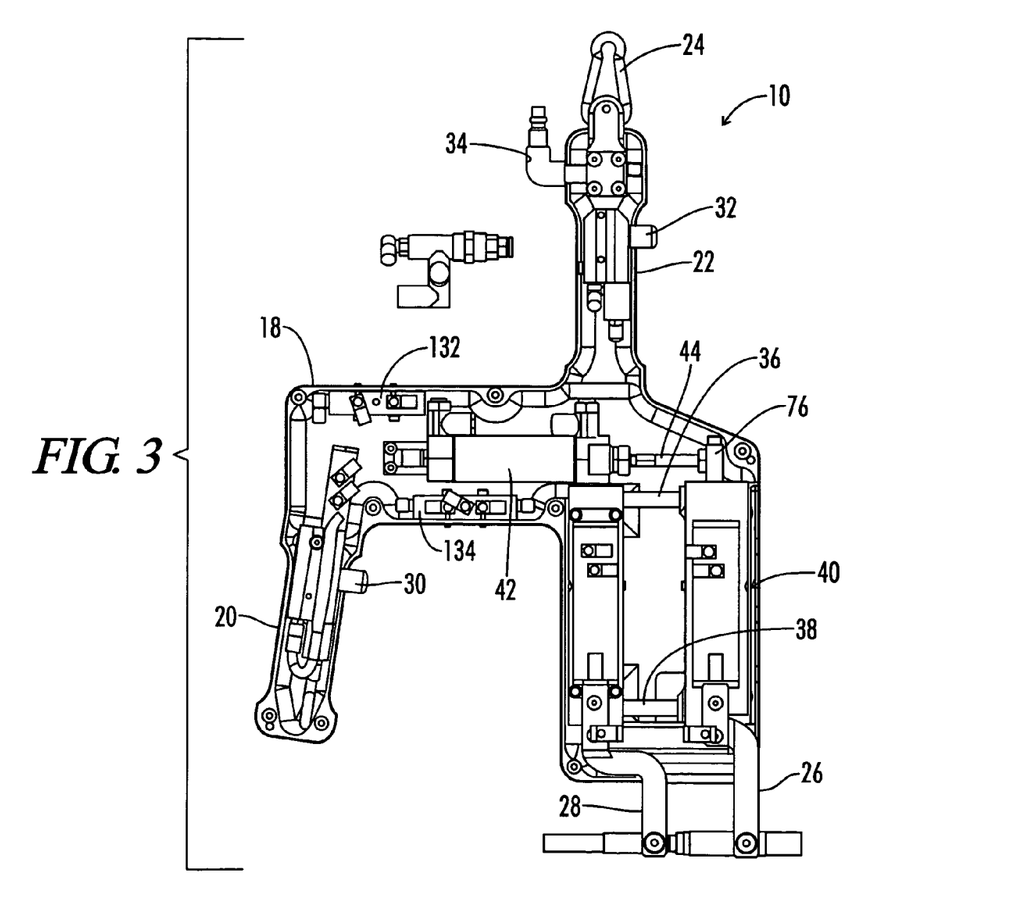
FIG. 3 is an elevation side view of the apparatus of FIG. 2 with one of the frame covers removed so that the internal components are visible.

The internal arrangement of the components of the apparatus 10 is best seen in FIG. 3 which is a side elevation view with one side of the housing framework 18 removed so that the internal components are visible.

The second gripper assembly 28 is fixedly mounted within the framework 18, and the first gripper assembly 26 slides relative thereto upon a pair of guide shafts 36 and 38 which extend between the fixed gripper assembly 28 and a mounting plate 40 which attaches to the inside of housing 18 as best seen in FIG. 3.

A pneumatic actuator ram 42 is mounted within the frame 18 and includes a piston 44 extending therefrom which is connected to the moveable gripper assembly 26 to slide the same back and forth upon the shafts 36 and 38 so as to provide relative movement between the first and second gripper assemblies 26 and 28.

Figure 4:
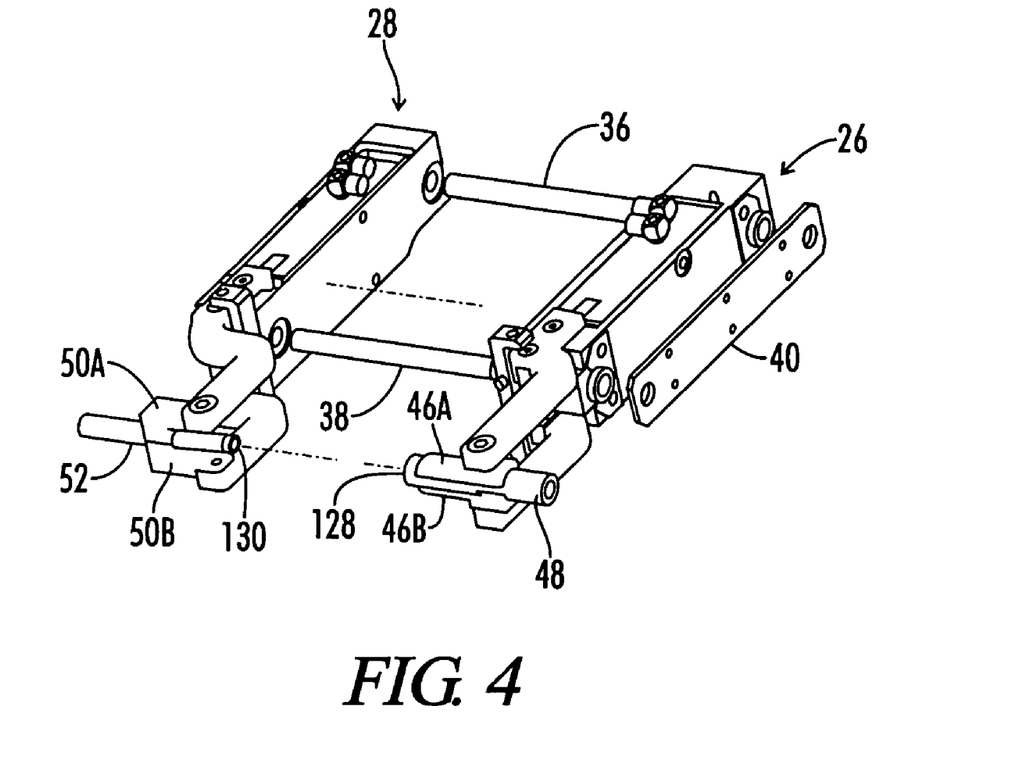
FIG. 4 is an exploded view of the combined gripper assembly including both the moveable gripper assembly and the fixed gripper assembly and the pair of slide rods which mount on the frame and which align the two gripper assemblies.

As best seen in FIG. 4, the first gripper assembly 26 includes a first set of gripper jaws 46A and 46B which are shown in place above a length of flexible hose 48. The fixed second gripper assembly 28 includes a second pair of gripper jaws 50A and 50B which are shown gripping a length of rigid tubing 52.

The first and second shafts 36 and 38 can be generally referred to as a slide guide 36, 38 and the first gripper assembly 48 can be described as being slideably mounted upon the slide guide 36, 38.

As will be further described below, the first trigger or button 30 is operably associated with the first gripper assembly 26 for closing the first set of gripper jaws 46A and 46B in response to the human operator 16 squeezing the first trigger 30 with a first hand gripping the first handle 20.

Figure 9A:
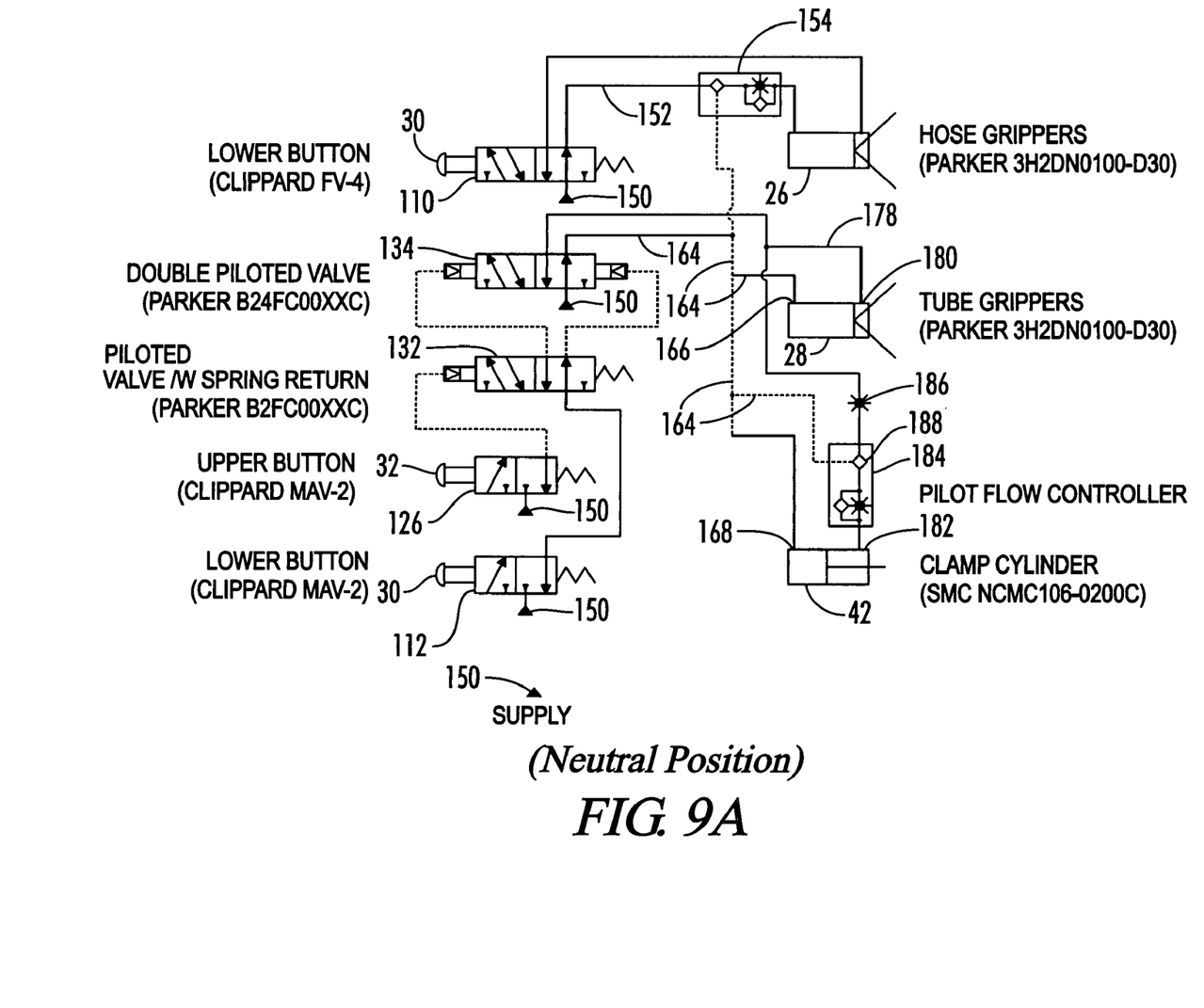
FIG. 9A is a pneumatic logic circuit illustrating the interconnection of the triggers with the actuator and the trigger assemblies, with components in a neutral position.
Figure 9B:
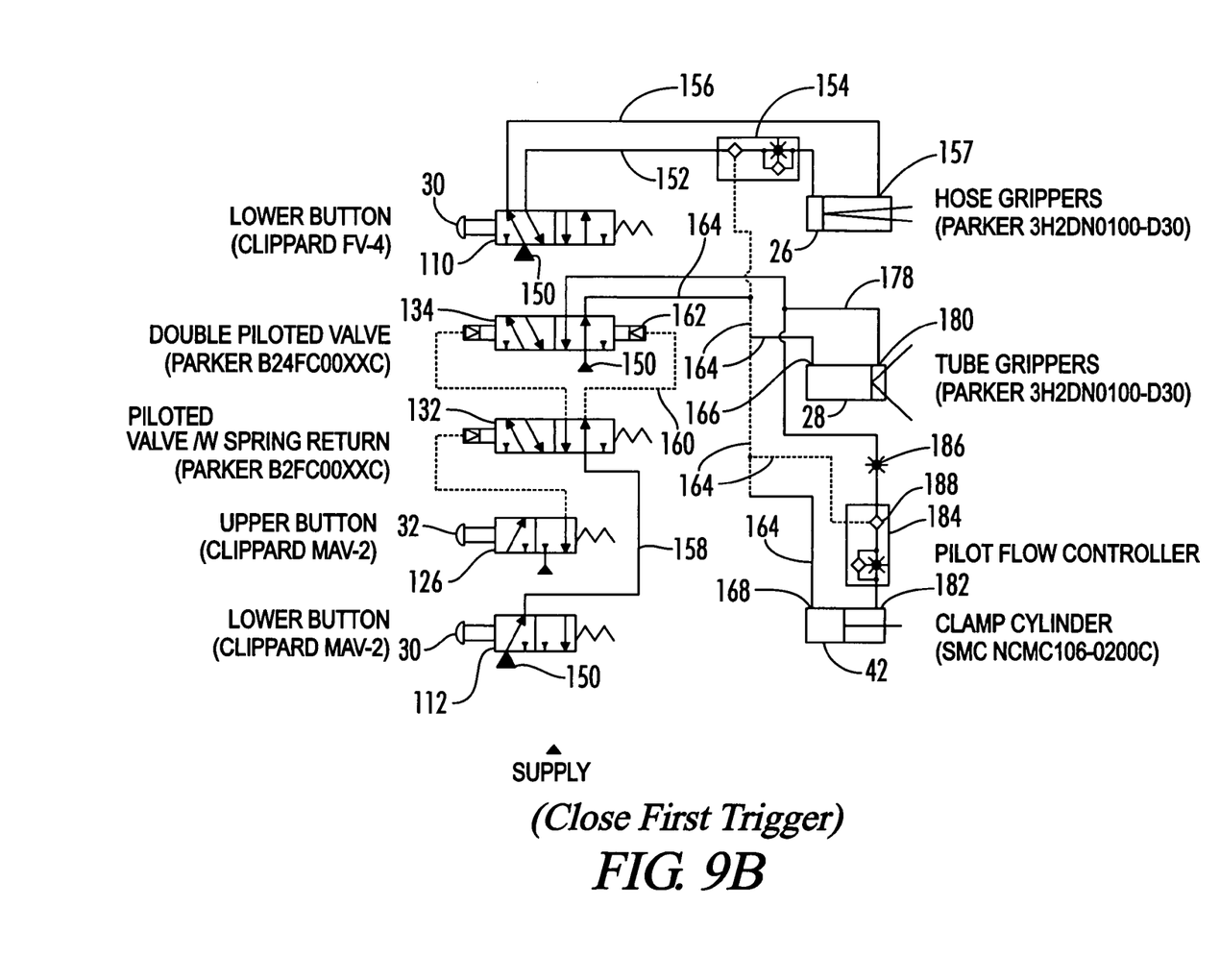
FIG. 9B is a pneumatic logic circuit illustrating the interconnection of the triggers with the actuator and the trigger assemblies, with the first trigger actuated.
Figure 9C:
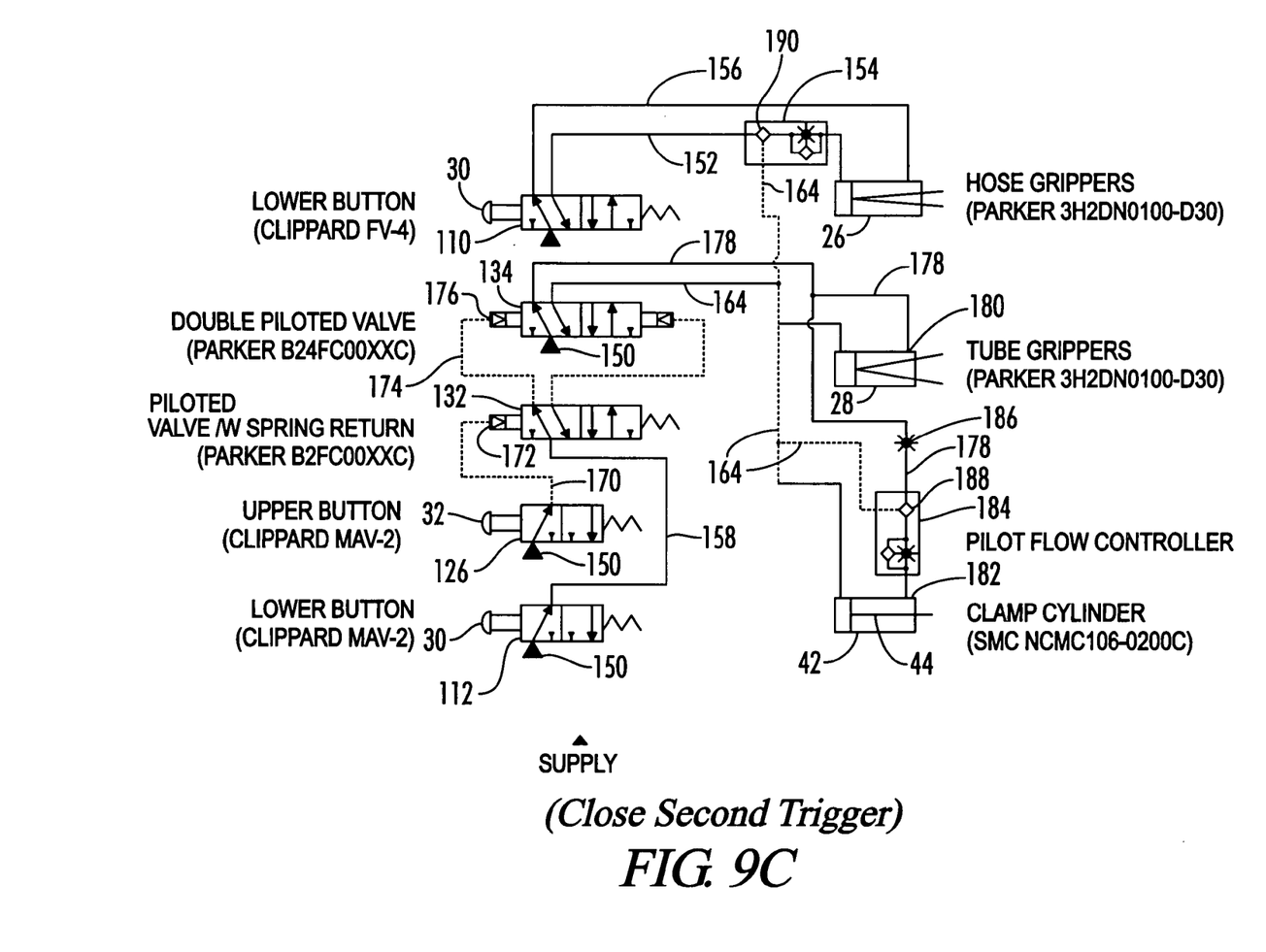
FIG. 9C is a pneumatic logic circuit illustrating the interconnection of the triggers with the actuator and the trigger assemblies, with both triggers actuated.

The second trigger 32 is operably associated with both the second gripper assembly 28 and with the actuator 42. As further described below, when the human operator 16 engages the second handle 22 with his or her other hand and squeezes the second trigger 32, in a preferred operating mode the second gripper assembly 28 will first close the second pair of gripper jaws 50A and 50B to grip the tubing 52, and then according to the pneumatic logic embodied in the circuit of FIG. 9, the actuator 42 will move the first gripper assembly 26 toward the second gripper assembly 28 to insert the tube 52 into the hose 48.

Figure 5:
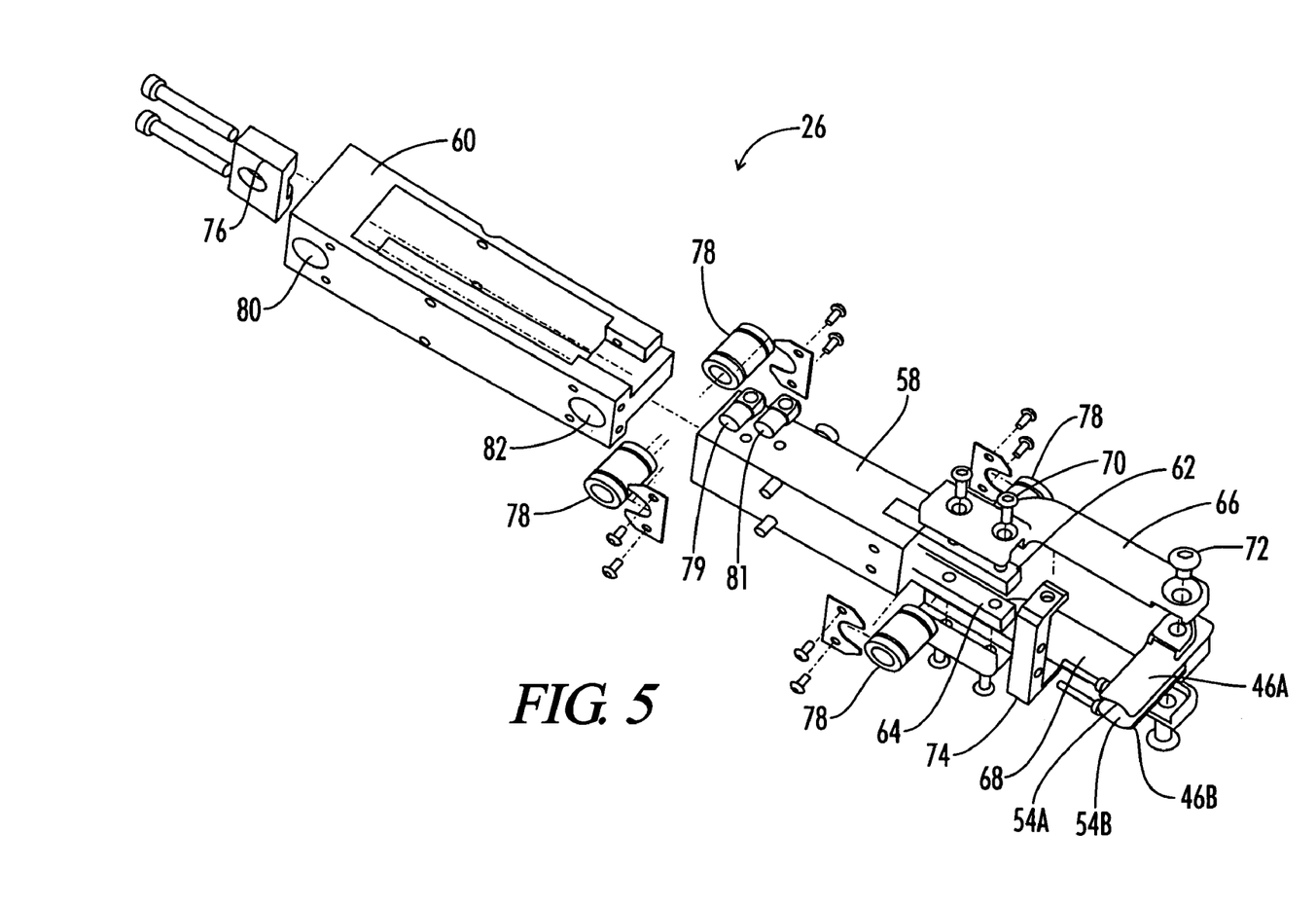
FIG. 5 is an exploded view of the moveable gripper assembly.

As best seen in FIG. 5, the first pair of gripper jaws 46A and 46B include a pair of partially cylindrical elongated support surfaces 54A and 54B which are dimensioned to closely engage and support the exterior surface of the flexible hose 48 when the hose 48 is held in place between the jaws 46A and 46B.

Similarly, the second set of gripper jaws 50A and 50B have partially cylindrical surfaces 56A and 56B for engaging the rigid tube 52.

The details of construction of the moveable gripper assembly 26 are best shown in FIG. 5. The gripper assembly 26 includes a powered gripper 58 which is a commercially available item and may for example be a Parker Model H2 Series double acting gripper available from Parker Hannifin Corporation. The gripper 58 is mounted within a moveable gripper main housing block 60. The gripper 58 has gripper bars 62 and 64 extending therefrom. A pair of gripper arms 66 and 68 are attached to the gripper bars 62 and 64, respectively, by suitable fasteners such as machine screw 70. The jaws 46A and 46B are mounted on the ends of arms 66 and 68, respectively, again with suitable fasteners such as machine screw 72. U-shaped limit bracket 74 limits movement of the arms 66 and 68 away from each other.

A mount 76 is attached to the upper end of housing block 60 and is in turn attached as seen in FIG. 3 to the piston 44.

Linear bearings 78 are received in bores 80 and 82 of housing block 60 for receipt of shafts 36 and 38, respectively, therethrough.

Pneumatic connections 79 and 81 are provided to the gripper 58.

Figure 6:
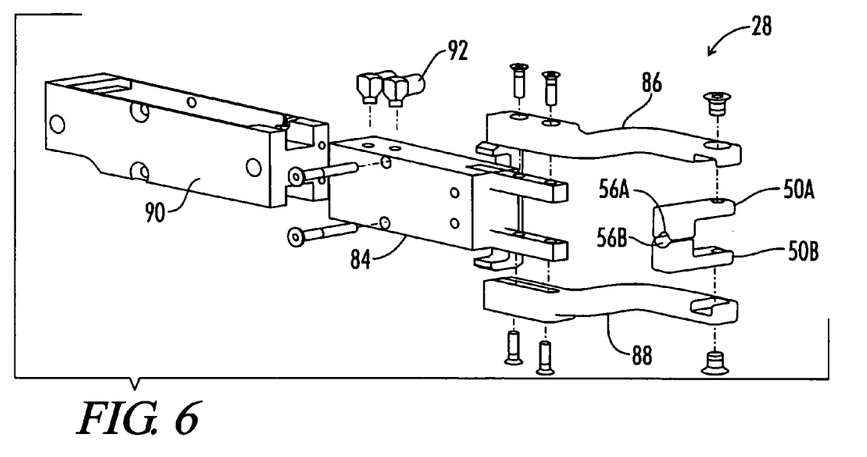
FIG. 6 is an exploded view of the fixed gripper assembly.

Fixed gripper assembly 28 shown in FIG. 6 is constructed in a somewhat similar manner. A second gripper 84, which again may be a Parker H2 Series double acting gripper, has arms 86 and 88 attached thereto. The jaws 50A and 50B are in turn attached to arms 86 and 88, respectively. The gripper 84 is received in a fixed gripper assembly main housing block 90. Pneumatic connections 92 are provided to the second gripper 84.

It is noted that although in the preferred embodiment illustrated, the second gripper assembly 28 is fixed and the first gripper assembly 26 moves relative thereto, those functions could be reversed. Also, the apparatus could be constructed so that both grippers simply move relative to the frame 18.

Although in the present embodiment the guide provided by shafts 36 and 38 is a linear sliding motion it will be understood that other actuating motions could be used and other types of actuators other than ram 42 could be used to provide a power assisted motion of the first gripper assembly 26 relative to the second gripper assembly 28.

Figure 7:
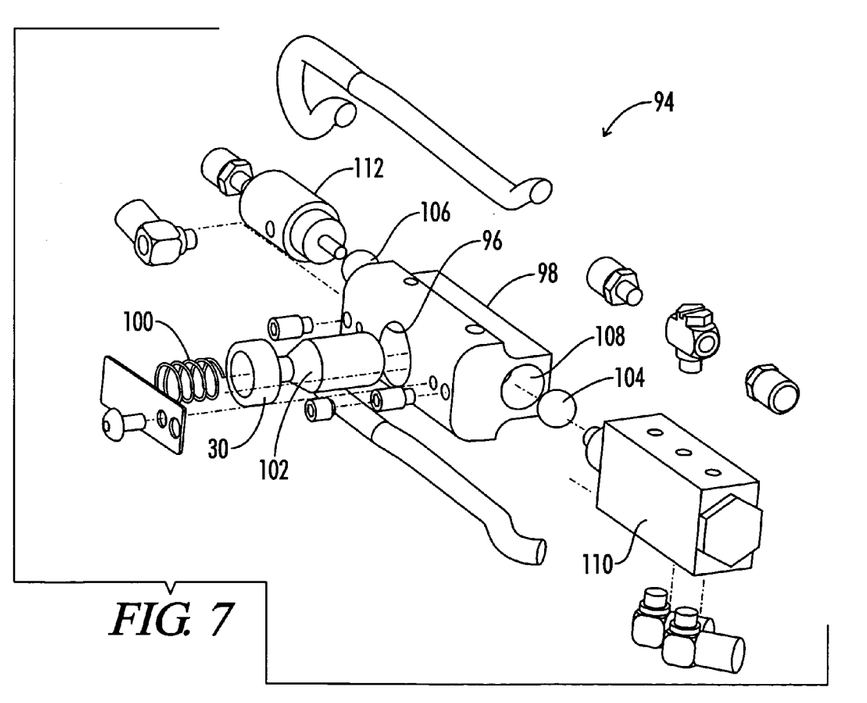
FIG. 7 is an exploded view of the first trigger assembly.

FIG. 7 illustrates the details of construction of a first trigger assembly 94 associated with the first trigger 30. The first trigger 30 is received in a transverse bore 96 of first trigger housing 98. A return spring 100 urges the first trigger 30 from left to right as viewed in FIG. 7.

The first trigger 30 carries a tapered annular surface 102 which engages first and second actuator balls 104 and 106 which are contained in a linear bore 108 of the housing 98.

Upon squeezing the trigger 30 to move it from right to left as viewed in FIG. 7, the tapered surface 102 engages balls 104 and 106 and urges them away from each other. The first ball 104 actuates a first valve 110 which may for example be a Clippard Minimatic 4-way 5-port spool valve plunger with actuated spring return.

The second ball 106 engages second valve 112 to actuate the same. The second valve 112 may for example be a Clippard Minimatic normally closed 2-way poppet valve.

The valves 110 and 112 are connected to the pneumatic system of FIGS. 9A–9C by conventional connectors and tubing as illustrated.

Figure 8:
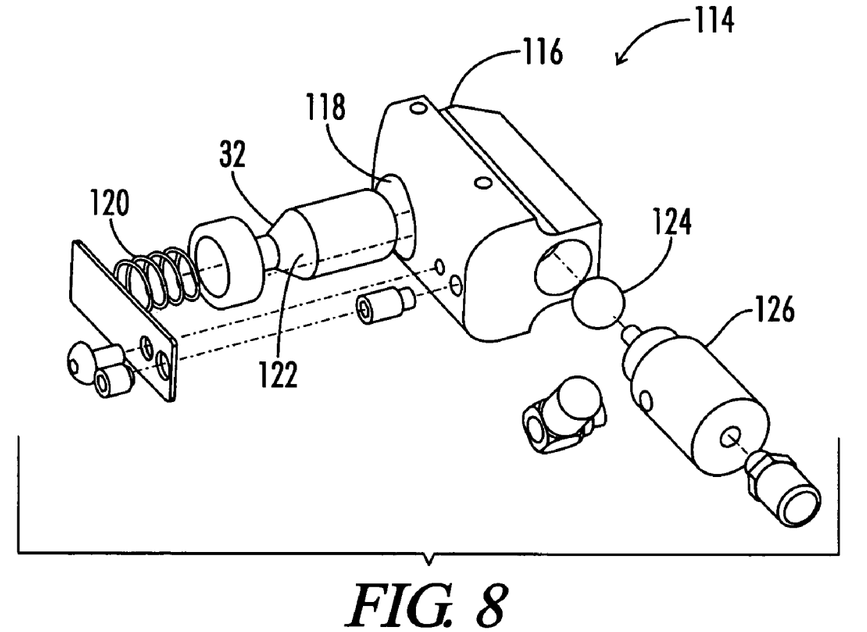
FIG. 8 is an exploded view of the second trigger assembly.

Referring now to FIG. 8, the second trigger 32 is part of a second trigger assembly 114 contained in the second handle 22. The second trigger assembly includes a second trigger housing 116 having a transverse bore 118 in which the second trigger 32 is slideably received. A return spring 120 urges the second trigger 32 from left to right as shown in FIG. 8.

The second trigger 32 has a tapered annular surface 122 defined thereon which engages actuator ball 124 which actuates a third valve 126. The third valve 126 may for example be a Clippard Minimatic normally closed 2-way poppet valve. The valve 126 is connected to the pneumatic system of FIGS. 9A–9C by conventional connectors.

Also, associated with the first, second and third valves 110, 112 and 126 are two piloted valves 132 and 134 which are best seen in FIG. 3 and schematically in FIG. 9.

Piloted valve 132 is preferably a single pilot valve with spring return which may for example be a Parker Model V2FC00XXC. The piloted valve 134 is preferably a double piloted valve which may for example be a Parker Model B24FC00XXC.

FIGS. 9A, 9B and 9C schematically illustrate the pneumatic logic circuit connecting the five valves with the actuator cylinder 42 and the first and second gripper assemblies 26 and 28.

FIG. 9A shows the various valves and the hose grippers, tube grippers and actuating ram all in their neutral positions prior to actuating either of the triggers 30 or 32.

In the schematic figures, an air supply 150 is designated by a dark triangle. It is noted that in the neutral position of FIG. 9A, the air supply 150 connected to the valve 112 associated with first button 30 is blocked. The air supply 150 associated with valve 110 which is also associated with the first button 30 is connected via line 152 to a flow controller 154. The hose gripper 26 and tube gripper 28 are both in their open position as schematically illustrated, and the actuating ram 42 is in its extended position. Air supply 150 associated with valve 126 of upper button 32 is also blocked.

FIG. 9B shows the change in orientation when the first trigger 30 is closed thus actuating the valves 110 and 112 associated therewith.

As shown in the upper left portion of FIG. 9B, actuation of the first button 30 moves the valve 110 into the function shown on its left hand side wherein the air source 150 is connected via line 156 to a grip port 157 on the right hand side of the schematically illustrated hose grippers 26 thus closing the hose grippers 26.

The same squeezing of the first trigger 30 also actuates valve 112 shown in the lower left of FIG. 9B, moving it to its left hand function wherein its air supply 150 is now communicated via line 158 to the right hand function shown on piloted valve 132. The flow from line 158 passes through valve 132 and via line 160 to a first pilot end 162 of pilot valve 134. The air supply 150 associated with pilot valve 134 is communicated via line 164 to a release port 166 of tube grippers 28 to maintain the tube grippers 28 in their open position as illustrated. Line 164 also is communicated with an open port 168 of air cylinder 42 to hold it in its extended position.

The system of FIGS. 9A, 9B and 9C is designed such that the first button 30 must be maintained in a closed position when the second button 32 is actuated. Thus, FIG. 9C shows the further change in orientation of components, as compared to FIG. 9B, when the second trigger 32 is closed.

Upon closing the second trigger 32, the valve 126 is moved to its left hand function as shown in FIG. 9C wherein its air source 150 is communicated via line 170 with a pilot end 172 of piloted valve 132, thus moving piloted valve 132 to its left hand function so that the line 158 from valve 112 is now communicated via the left hand function of pilot valve 132 to line 174 which connects to the left pilot end 176 of piloted valve 134, thus moving piloted valve 134 to its left hand function as illustrated in FIG. 9C. Thus the air source 150 associated with piloted valve 134 is now communicated via line 178 with the grip port 180 of tube grippers 28 thus closing the same, and with the insert port 182 of ram 42 thus causing ram 42 to retract the piston 44 thus drawing the hose grippers 26 toward the tube grippers 28 to insert the tube 52 into the hose 48.

It is noted that there is a needle valve 186 disposed in the line 178 upstream of insert port 182 of actuating cylinder 42. The purpose of needle valve 186 is to provide a flow restriction and thus a time delay in the retraction of piston 44 into cylinder 42, so that the tube grippers 28 grip the tube 52 before the actuating ram 42 pulls the hose grippers 26 toward the tube grippers 28.

The system of FIGS. 9A, 9B and 9C is also constructed such that the first button 30 must be maintained in a closed position in order to release the second button 32. This is accomplished by a piloted flow controller 184, which restricts flow out of the actuating ram 42 and prevents the actuating ram 42 from moving from left to right as shown in FIG. 9C unless air pressure is present via line 164 to a check valve 188 of the piloted flow controller 184.

The function of the flow controller 154 shown in line 52 between valve 110 and the hose grippers 26 is to make certain that the hose grippers 26 will not open while the actuating cylinder 42 is in its retracted position of FIG. 9C. It is noted that in the position of FIG. 9C, air pressure from line 164 is relieved via piloted valve 134, and thus there is no pressure to actuate the check valve 190 of flow controller 154. Thus even if first button 30 is released back to its position of FIG. 9A, air cannot flow to the hose grippers 26 past the check valve 190.

Thus to perform an operating cycle, the first trigger 30 must be first actuated, then held throughout actuation of second trigger 32. Then the second trigger 32 must be released before releasing the first trigger 30.

Methods of Using the Apparatus

The following describes an example of usage of the apparatus 10 in an automobile assembly plant environment to assemble a flexible hose with a rigid tube. For example, the flexible hose may be an elastomeric hose leading from a fuel filter and the rigid tube may be a stainless steel fuel line.

The human operator 16 will grasp the apparatus 10 with both hands, one hand grasping the first handle 20 and the second hand grasping the second handle 22, and will position it close to a free end 128 (see FIG. 4) of the flexible hose 48 which is to be placed upon the tube 52. The flexible hose 48 will be placed between the grippers 46A and 46B leaving a small amount, on the order of from ⅛ inch to ¼ inch of hose showing as seen in FIG. 4. During this step, the hose 48 may be placed between the hose grippers 46A and 46B by the human operator 16 releasing the upper handle 22 and using the free hand carefully sliding the hose between the jaws 46A and 46B. During such procedure the human operator 16 should be careful to keep fingers free of the grippers 46A and 46B.

The human operator 16 then activates first trigger 30 by depressing the first trigger 30 all the way. This in turn actuates valves 110 and 112 which will cause the jaws 46A and 46B to close, thus gripping the hose therebetween. The operator 16 should then inspect the hose 48 to insure proper placement within the gripper jaws 46A and 46B to make sure the hose is not misaligned and that the hose is protruding a small amount past the jaws.

The operator 16 then moves the device 10 with the aid of the counterbalance 12 so as to properly orient the device 10 relative to the rigid tube 52 which in this example is already fixed to the vehicle 14 and thus is in a fixed position. The second pair of jaws 50A and 50B are slid in place over the tube 52 with a free end 130 (see FIG. 4) of tube 52 aligned with and touching the free end 128 of flexible hose 48. A slight but positive pressure should be maintained between the free end 128 of hose 48 and the free end 130 of tube 50.

While maintaining good contact between the free ends of hose 48 and tube 52, the human operator 16 squeezes the second trigger 32 which causes the second pair of jaws 50A and 50B to first grip the rigid tube 52, and then the moveable gripper assembly 26 slides upon shafts 36 and 38 due to the power assist of ram 42 to push the flexible hose 48 over the rigid tube 52.

It is noted that the apparatus 10 is preferably constructed such that the first trigger 30 must be held throughout the process, or the second trigger 32 will not work.

After the hose 48 is fully pushed upon the tube 50, the second trigger 32 is released followed immediately by releasing the first trigger 30. This will open both gripper assemblies 26 and 28 and return them to the starting position for another cycle.

The apparatus 10 is then removed from the assembled hose and tube 48 and 52 by pulling the device 10 upward with the aid of the counterbalance 12. The hose and tube assembly should pass downward between the spread apart gripper jaws. For some hose and tube configurations it may be necessary for the human operator 16 to release the upper handle 22 and aid the hose and tube assembly exiting between the grippers.

In the examples illustrated, the apparatus 10 is constructed so that when the apparatus is suspended by connector 24 from the counterbalance 12, the first handle 20 extends generally downward, the second handle 22 extends generally upward, and the movement of the first gripper assembly 26 toward the second gripper assembly 28 is in a generally horizontal direction when the frame 18 is suspended from the counterbalance 12. This particular arrangement was selected because of the generally horizontal orientation of the fuel line and fuel filter hose desired to be assembled. It will be understood, however, that the components of the apparatus 10 could be rearranged so as to provide any desired orientation of the gripper assemblies 26 and 28 to more conveniently engage and assemble whatever components are to be connected.

It will also be appreciated that the apparatus 10 could be utilized to assemble any two components which require linear sliding motion of one component into the other. For example, the gripper assemblies 26 and 28 could be used to grip two electrical components, one of which is to be inserted into the other to make an electrical connection.

Thus it is seen that the apparatus and methods of the present invention readily achieve the ends and advantages mentioned as well as those inherent therein. Although certain preferred embodiments of the invention have been illustrated and described for purposes of the present disclosure, numerous changes may be made by those skilled in the art which changes are encompassed within the scope and spirit of the present invention and defined by the appended claims.

What is claimed is:

1. An apparatus for assembling a rigid tube into a flexible hose, comprising:
    a frame;
    a first gripper assembly connected to the frame and including a first set of gripper jaws for gripping one of said flexible hose and said rigid tube;
    a second gripper assembly connected to the frame and including a second set of gripper jaws for gripping the other of said flexible hose and said rigid tube;
    an actuator assembly connected to the frame and to the first gripper assembly, for moving the first gripper assembly toward the second gripper assembly to insert the rigid tube into the flexible hose;
    a first trigger operably associated with the first gripper assembly for closing the first set of gripper jaws; and
    a second trigger operably associated with the second gripper assembly and with the actuator assembly, for closing the second set of gripper jaws and then actuating the actuator assembly to move the first gripper assembly toward the second gripper assembly.

2. The apparatus of claim 1, wherein:
    the frame includes first and second spaced handles; and
    the first and second triggers are located on the first and second handles, respectively.

3. An apparatus for assembling a rigid tube into a flexible hose, comprising:
    a frame;
    a first gripper assembly connected to the frame and including a first set of gripper jaws for gripping one of said flexible hose and said rigid tube;
    a second gripper assembly connected to the frame and including a second set of gripper jaws for gripping the other of said flexible hose and said rigid tube;
    an actuator assembly connected to the frame and to the first gripper assembly, for moving the first gripper assembly toward the second gripper assembly to insert the rigid tube into the flexible hose;
    first and second triggers, operably associated with the first and second gripper assemblies, respectively; and
    wherein the frame includes first and second handles, having the first and second triggers, respectively, mounted thereon.

4. The apparatus of claim 3, wherein:
    one of the handles extends vertically and has an upper end with a connector on the upper end so that the frame can be suspended from an overhead support.

5. The apparatus of claim 4, wherein:
    the other handle extends generally downward.

6. An apparatus for assembling a rigid tube into a flexible hose, comprising:
    a frame;
    a first gripper assembly connected to the frame and including a first set of gripper jaws for gripping one of said flexible hose and said rigid tube;
    a second gripper assembly connected to the frame and including a second set of gripper jaws for gripping the other of said flexible hose and said rigid tube;
    an actuator assembly connected to the frame and to the first gripper assembly, for moving the first gripper assembly toward the second gripper assembly to insert the rigid tube into the flexible hose;

first and second triggers; and a control system, operably connecting the first and second triggers to the first and second gripper assemblies and to the actuator assembly, so that:

actuation of the first trigger closes the first gripper assembly; and actuation of the second trigger assembly closes the second gripper assembly and then causes the actuator assembly to move the first gripper assembly toward the second gripper assembly.

7. The apparatus of claim 6, wherein:
the control system requires the first trigger to remain actuated during the actuation of the second trigger.

8. The apparatus of claim 6, wherein:
the control system requires the second trigger to be released before the first gripper assembly can be opened.

9. An apparatus for automated assembly of first and second components on an assembly line, comprising:

a moveable frame adapted to be moveable relative to the assembly line so that the frame can be oriented relative to one of the components on the assembly line;

a first holder assembly mounted on the frame and adapted to hold said first component;

a second holder assembly mounted on the frame and adapted to hold the second component;

an actuator assembly connected to the frame and the first holder assembly for moving the first holder assembly toward the second holder assembly to insert one of the components into the other of the components;

a first trigger operably associated with the first holder assembly for closing the first holder assembly to hold a first component; and a second trigger operably associated with the second holder assembly and with the actuator assembly, for closing the second holder assembly and then actuating the actuator assembly to move the first holder assembly toward the second holder assembly.

10. The apparatus of claim 9, wherein:
the first holder assembly is moveable relative to the frame; and
the second holder assembly is fixed relative to the frame.

11. The apparatus of claim 10, wherein:
the frame includes a slide guide;
the first holder assembly is slidably mounted on the slide guide; and
the actuator assembly includes a ram connected to the first holder assembly for sliding the first holder assembly on the slide guide.

12. The apparatus of claim 9, wherein:
the frame includes first and second spaced handles; and
the first and second triggers are located on the first and second handles, respectively.

13. The apparatus of claim 9, further comprising:
a counterbalance; and
a connector on the frame for suspending the frame from the counterbalance so that a human operator can move the frame about without supporting the weight of the frame.

14. A component installation apparatus, comprising:
a manually manipulatable frame, including a guide;
a first gripper assembly mounted on the guide for movement relative to the frame, and including a first pair of jaws movable relative to each other;
a second gripper assembly, connected to the frame, and including a second pair of jaws aligned with the first pair of jaws; and
an actuator connected between the frame and the first gripper assembly and arranged to move the first gripper assembly back and forth upon the guide; and
a first trigger operably associated with said first gripper assembly.

15. The apparatus of claim 14, wherein:
one of said pairs of jaws includes a pair of partially cylindrical elongated support surfaces for gripping and supporting a flexible hose.

16. The apparatus of claim 14, further comprising:
a second trigger, operably associated with the second gripper assembly; and
wherein the frame includes first and second handles, having the first and second triggers, respectively, mounted thereon.

17. The apparatus of claim 16, wherein:
one of the handles extends vertically and has an upper end with a connector on the upper end so that the frame can be suspended from an overhead support.

18. The apparatus of claim 17, wherein:
the other handle extends generally downward.

19. The apparatus of claim 14, further comprising:
a second trigger; and
a control system, operably connecting the first and second triggers to the first and second gripper assemblies and to the actuator, so that:
actuation of the first trigger closes the first gripper assembly; and
actuation of the second trigger assembly closes the second gripper assembly and then causes the actuator to move the first gripper assembly toward the second gripper assembly.

20. The apparatus of claim 19, wherein:
the control system requires the first trigger to remain actuated during the actuation of the second trigger.

21. The apparatus of claim 19, wherein:
the control system requires the second trigger to be released before the first gripper assembly can be opened.

22. A method of assembling a flexible hose and a rigid tube, comprising:
(a) gripping the flexible hose with a first pair of powered jaws mounted on a frame;
(b) gripping the rigid tube with a second pair of powered jaws mounted on the frame;
(c) moving the first pair of powered jaws toward the second pair of powered jaws with power assistance, and thereby inserting the rigid tube into the flexible hose;
(d) actuating a first trigger with a first hand of a human operator to initiate step (a); and
(e) actuating a second trigger with the operator's other hand to initiate step (b).

23. The method of claim 22, wherein:
the gripping of step (a) is maintained throughout steps (b) and (c).

24. The method of claim 22, further comprising:
prior to step (a), suspending the frame from a counterbalance, and during step (c), supporting the frame from the counterbalance.

25. The method of claim 22, wherein:
step (a) includes gripping the flexible hose between a pair of opposed partially cylindrical support surfaces on the first pair of powered jaws, with a free end of the flexible hose extending beyond the support surfaces toward the second pair of powered jaws; and
after initiation of step (a), and before step (b), moving the frame and abutting the free end of the flexible hose with a free end of the rigid tube, so that the hose and tube are aligned.

26. The method of claim 22, further comprising:
gripping two spaced handles having the first and second triggers mounted thereon, and manually manipulating the frame to align the flexible hose with the rigid tube prior to step (b).

* * * * *